United States Patent
Vaishampayan et al.

(10) Patent No.: US 9,530,174 B2
(45) Date of Patent: Dec. 27, 2016

(54) SELECTIVE GPU THROTTLING

(71) Applicant: Apple Inc., Cupertino, CA (US)

(72) Inventors: Umesh Suresh Vaishampayan, Santa Clara, CA (US); Derek R. Kumar, Cupertino, CA (US); Cecile Marie Foret, Palo Alto, CA (US); Anthony Graham Sumpter, Santa Clara, CA (US); Harshavardhan P. Gopalakrishnan, Sunnyvale, CA (US); William E. Damon, III, McMurray, PA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,311

(22) Filed: Sep. 30, 2014

(65) Prior Publication Data

US 2015/0348226 A1    Dec. 3, 2015

Related U.S. Application Data

(60) Provisional application No. 62/006,009, filed on May 30, 2014.

(51) Int. Cl.
*G06T 1/20* (2006.01)
*G06F 1/20* (2006.01)
(Continued)

(52) U.S. Cl.
CPC ............... *G06T 1/20* (2013.01); *G06F 1/206* (2013.01); *G06F 9/4893* (2013.01); *G09G 5/363* (2013.01); *G06T 2200/28* (2013.01)

(58) Field of Classification Search
CPC ...... G06F 1/3203; G06F 1/3287; G06F 1/324; G06F 1/3293; G06F 1/206; G06F 1/3296; G06F 1/26; G09G 5/363; G09G 2330/021; G09G 2360/08; G06T 2210/52

See application file for complete search history.

(56) References Cited

U.S. PATENT DOCUMENTS

| 7,454,631 B1 | 11/2008 | Laudon et al. |
| 8,203,562 B1 | 6/2012 | Alben et al. |

(Continued)

FOREIGN PATENT DOCUMENTS

| WO | WO 2005/096150 A1 | 10/2005 |
| WO | WO 2013/089989 A1 | 6/2013 |

OTHER PUBLICATIONS

PCT International Search Report and Written Opinion for PCT International Appln No. PCT/US2015/030894 mailed Jul. 8, 2015. (13 pages).

(Continued)

*Primary Examiner* — Jeffrey Chow
(74) *Attorney, Agent, or Firm* — Blakely, Sokoloff, Taylor & Zafman LLP

(57) ABSTRACT

A method and apparatus of a device that manages a thermal profile of a device by selectively throttling graphics processing unit operations of the device is described. In an exemplary embodiment, the device monitors the thermal profile of the device, where the device executes a plurality of processes that utilizes a graphics processing unit of the device. In addition, the plurality of processes include a high priority process and a low priority process. If the thermal profile of the device exceeds a thermal threshold, the device decreases a first GPU utilization for the low priority process and maintains a second GPU utilization for the high priority process. The device further executes the low priority process using the first GPU utilization with the GPU and executes the high priority process using the second GPU utilization with the GPU.

20 Claims, 9 Drawing Sheets

(51) Int. Cl.
*G06F 9/48* (2006.01)
*G09G 5/36* (2006.01)

(56) References Cited

U.S. PATENT DOCUMENTS

| | | | |
|---|---|---|---|
| 2004/0128100 A1 | 7/2004 | Roten | |
| 2005/0289362 A1* | 12/2005 | Merkin | G06F 1/3203 713/300 |
| 2008/0028778 A1* | 2/2008 | Millet | G06F 1/206 62/129 |
| 2010/0007646 A1* | 1/2010 | Tsuei | G06F 1/3203 345/212 |
| 2010/0117579 A1* | 5/2010 | Culbert | G06F 1/20 318/471 |
| 2011/0072178 A1* | 3/2011 | Mace | G06F 13/161 710/244 |
| 2011/0115802 A1 | 5/2011 | Mantor et al. | |
| 2012/0271481 A1* | 10/2012 | Anderson | G06F 1/206 700/299 |
| 2013/0057563 A1 | 3/2013 | Persson | |
| 2013/0155080 A1 | 6/2013 | Nordlund et al. | |
| 2013/0155081 A1* | 6/2013 | Khodorkovsky | G06F 1/3206 345/522 |
| 2013/0162661 A1 | 6/2013 | Bolz et al. | |
| 2014/0109102 A1 | 4/2014 | Duncan et al. | |
| 2015/0006925 A1* | 1/2015 | Branover | G06F 1/3206 713/320 |
| 2015/0067377 A1* | 3/2015 | Park | G06F 1/3212 713/340 |
| 2015/0317762 A1* | 11/2015 | Park | G06T 1/20 345/505 |

OTHER PUBLICATIONS

Search Report ROC (Taiwan) Patent Application No. 104116883, Jan. 13, 2016, 1 pg.

\* cited by examiner

GPU THROTTLING TABLE 200A
NO GPU
THROTTLING

GPU THROTTLING TABLE 200B
SOME GPU
THROTTLING FOR LOW
PRIORITY PROCESSES

GPU THROTTLING TABLE 200C
GREATER GPU
THROTTLING

SELECTIVE GPU THROTTLING

RELATED APPLICATIONS

Applicant claims the benefit of priority of prior, provisional application Ser. No. 62/006,009 filed May 30, 2014, the entirety of which is incorporated by reference.

FIELD OF INVENTION

This invention relates generally to device thermal management and more particularly to managing device thermal management by selective throttling of the device graphics processing unit.

BACKGROUND OF THE INVENTION

A device can typically include one or more graphics processing units (GPU) that are used to process graphics or general purpose operations for the device. Each of the GPUs is a specialized electronic circuit designed to rapidly manipulate and alter memory to accelerate the creation of images in a frame buffer intended for output to a display. For example, the GPU can be used to transcode video, render graphics for a user interface (UI), video encoding/decoding, OpenCL, etc.

Each of these GPU operations will cause the device to consume power that leads to heat being generated by the device. This generated heat can add to the to a thermal load being applied to the device. An excessive thermal load can affect the device performance and, in extreme cases, can lead to a device shutdown. Existing devices can mitigate the thermal load by reducing the GPU operating frequency globally for all processes, regardless of whether the GPU operations are for a batch process or a process supporting a user interface operation.

SUMMARY OF THE DESCRIPTION

A method and apparatus of a device that manages a thermal profile of a device by selectively throttling graphics processing unit operations of the device is described. In an exemplary embodiment, the device monitors the thermal profile of the device, where the device executes a plurality of processes that utilizes a graphics processing unit of the device. In addition, the plurality of processes include a high priority process and a low priority process. If the thermal profile of the device exceeds a thermal threshold, the device decreases a first GPU utilization for the low priority process and maintains a second GPU utilization for the high priority process. The device further executes the low priority process using the first GPU utilization with the GPU and executes the high priority process using the second GPU utilization with the GPU.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
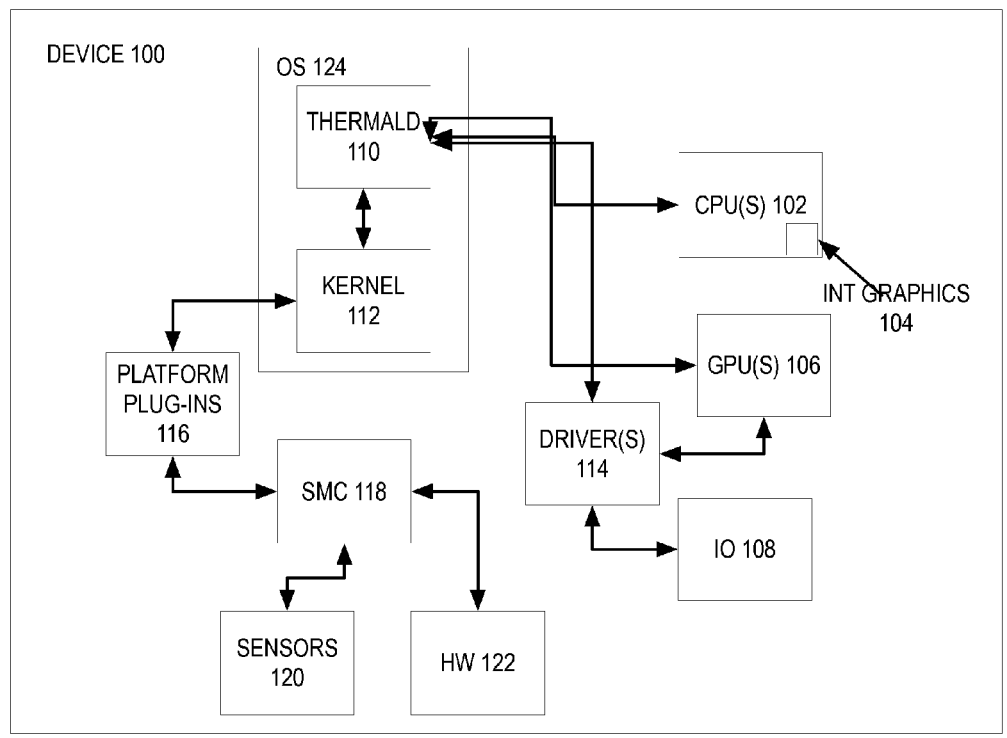
FIG. 1 is a block diagram of one embodiment of a device that mitigates a thermal profile of a device by selectively throttling graphics processing unit operations of the device.

A method and apparatus of a device that manages a thermal profile of a device by selectively throttling graphics processing unit operations of the device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that manages a thermal profile of a device by selectively throttling graphics processing unit (GPU) operations of the device is described.

In one embodiment, the device selectively throttles the GPU operations by restricting GPU utilization for one, some, or all of the processes, so that the overall GPU utilization is reduced, but that the GPU operations for higher quality of service (QoS) priority process are not affected or are affected less than GPU operations for lower QoS priority processes. In one embodiment, the device monitors the thermal data of the device. If the thermal data reaches or exceeds one or more thermal thresholds, the device selectively throttles the GPU operations for the different processes. In this embodiment, each process operation has a QoS priority (or "priority"). Each priority represents whether the process is an important process that should not be throttled (or throttled under more of a thermal load) or the process can be a less important process that can be throttled under a lesser thermal load. For example and in one embodiment, a process associated with user interface operation would have a higher priority (e.g., graphic rendering for a UI or graphics visual, encoding/decoding for a video call, encoding for framebuffer transmission to wireless display device(s), and/or other types of high priority processes), whereas a process associated with a batch process (e.g., video transcoding, batch decoding/encoding, background streaming compute workloads, infrequent or non-interactive graphical output, and/or other types of batch-type processes), would have a lower priority. The device can include multiple different process priorities. Each of the priorities has an associated GPU utilization. The GPU utilization is the allowable GPU resources that each process can use during a GPU execution time slot. The device selectively throttles overall device GPU usage by restricting the GPU utilization for the different priorities based on the current thermal load on the device. For example and in one embodiment, if the device thermal load increases, the device can restrict the lowest or lower priority GPU utilizations. This would decrease the GPU usage for these lower priorities, but leave the GPU usage for the higher priorities unchanged. As the thermal load on the device further increases, the device can either increase the GPU throttling of the lower priority processes and/or start to throttle the higher priority processes. In another embodiment, as the thermal load on the device lessens, the device can selectively relax the GPU throttling for the different priority processes.

FIG. 1 is a block diagram of one embodiment of a device 100 that mitigates a thermal profile of a device by selectively throttling GPU operations of the device. In one embodiment, the device 100 can be a personal computer, laptop, server, mobile device (e.g., smartphone, laptop, personal digital assistant, music playing device, gaming device, etc.), network element (e.g., router, switch, gateway, etc.), and/or any device capable of executing multiple applications. In one embodiment, the device 100 can be a physical or virtual device. In FIG. 1, the device 100 includes one or more central processing units (CPUs) 102, graphics processing units 106, input/output (I/O) subsystem 108, driver(s) 114, an operating system 124, a system management controller (SMC) 118, sensors 120, and platform plug-ins 116. In one embodiment, the CPU 102 is a general-purpose processing device such as a microprocessor or another type of processor and is coupled to the operating system 124. More particularly, the CPU 102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The central processing unit (CPU) 102 may also be one or more special-purpose processing devices such as an application specific integrated circuit (ASIC), a field programmable gate array (FPGA), a digital signal processor (DSP), network processor, or the like. In one embodiment, the CPU 102 can include one or more CPUs and each of the CPUs can include one or more processing cores. In one embodiment, one or more of the CPUs 102 can include integrated graphics 104, in which the integrated graphics 104 is a graphics processing unit that shares memory with memory for the CPUs 102. While in one embodiment, the integrated graphics 104 is part of a corresponding CPU 102, in alternate embodiments, the integrated graphics is on the same motherboard as the corresponding CPU 102. In one embodiment, the device can have one or more GPUs 106, an integrated graphics 104, and/or a combination thereof.

In one embodiment, a GPU 104 is a specialized electronic circuit designed to rapidly manipulate and alter memory to accelerate the creation of images in a frame buffer intended for output to a display and is coupled to the operating system. In another embodiment, the GPU 104 can be used for other general purpose computing, such as general purpose computing on graphics processing unit. In this embodiment, the general purpose computing on graphics processing unit is the utilization of a graphics processing unit to perform computations in applications traditionally handled by a central processing unit. For example and in one embodiment, a graphics processing unit can be used for stream processing that is performing the same or similar operation on a set of records (e.g., vector processing, texture processing, or another type of data structure). In one embodiment, the GPU 104 can include one or more GPUs and each of the GPUs can include one or more graphic processing cores.

In one embodiment, the I/O subsystem 108 includes a storage controller and storage that is used to store data for the device. In one embodiment, the operating system 124 is a set of software used to manage device hardware resources and provides common services for other running computer programs, such as application programs. In one embodiment, the system management controller 118 is a subsystem that controls the device power flow and fan speed. In this embodiment, the system management controller 118 couples to the operating system 124, the sensors 120, and hardware 122. In one embodiment, the sensors 106 include sensor(s) that monitor and record data regarding the thermal profile of the device 100. In this embodiment, the thermal profile is data about the thermal characteristics of the device 100. For example and in one embodiment, the thermal profile can include the device 100 temperature over time, device 100 module temperature over time (e.g., storage temperature, CPU die temperature, bottom case temperature of the device enclosure, fan speed, and/or other data related to the thermal characteristics of the device 100. In one embodiment, the sensors 120 are one or more sensors that measure the thermal characteristics of the device 100. For example and in one embodiment, the sensors 120 can include a sensor for the device temperature, sensor for the I/O subsystem 108, fan speed sensor, virtual sensors (e.g., values derived from other sensors being read and other thermal models). In one embodiment, the driver(s) 114 are a software layer that translates high level commands coming from application or framework layers into commands that can be interpreted by the module it controls For example and in one embodiment, media drivers control the media functions on GPU, 3D drivers controls the 3D functions of the GPU. In one embodiment, the driver(s) 114 impact the behavior of the GPU, so GPU throttling can be performed in this layer. In one embodiment, the driver(s) 114 include a module to perform GPU throttling as described in the FIGS. 4 and 7 below. In one embodiment, the platform plug-ins 116 are modules that contain platform/device specific tuning parameters.

In one embodiment, the operating system 124 adjusts the operation of the GPU 106 to mitigate the thermal profile of the device 100. In this embodiment, the operating system 124 includes a thermal daemon (thermald) 110 and kernel 112. In this embodiment, thermald 110 is daemon that selectively throttles the GPU operations of one or more running processes in order to mitigate the thermal environment of the device 100. In one embodiment, thermald 110 receives the thermal data of the thermal profile and determines if the thermal data has crossed one of one or more thermal thresholds. In one embodiment, the device can be configured for several different thermal thresholds, with each thermal threshold having different GPU throttling levels. In this embodiment, crossing a thermal threshold can mean that thermald 110 adjusts a set of GPU utilization values for different priority level processes. In this embodiment, the priority utilization values are used by the GPU to schedule a GPU execution for a time slice of a process according to the priority of that operation. Each process has an associated priority that indicates the relative importance of how much of the GPU is to be utilized when that process is executed by the GPU. Processes with a higher priority are more likely to receive a higher GPU utilization than a lower priority process. In one embodiment, there can be a plurality of different priorities (e.g., two or more different priorities). In one embodiment, under conditions of a low thermal load of the device 100, each of the priorities will have a high GPU utilization (e.g. near or at 100%). As the thermal load on the device 100 increases, thermald 110 adjusts the priority GPU utilization of one or more of the different process priorities. In one embodiment, a thermal load on the device can increase because the power consumption of the device or one or more components of the device (e.g., the GPU 106, CPU 102, I/O 108, etc.) increases.

In one embodiment, thermald 110 selectively decreases the GPU utilization for the lower priority processes before decreasing the higher priority processes, so that GPU executions for lower priority processes are throttled before the higher priority processes. By selectively throttling the lower priority process GPU executions, the GPU execution for the higher priority processes are not throttled, but the overall GPU usage decreases, thus decreasing the power consumption of the storage system for the device 100, and decreasing the heat generated by the device, and reducing the thermal load on the device 100. If the thermal load on the device 100 continues to increase, thermald 110 can either further throttle the lower priority processes or start to throttle the higher priority processes. In one embodiment, thermald 110 throttles both the lower and higher priority processes. In another embodiment, as the thermal load of the device decreases, thermald 110 lessens or removes the throttling of the lower and/or higher levels by relaxing the constraints placed on the different priority processes. In this embodiment, if the thermal load of the device becomes low, thermald 110 restores the priority of one, some, or all processes to normal (e.g., 100% GPU utilization). The GPU throttling can occur by throttling either one, some or all of the GPU(s) 106, the integrated graphics 104, or both. Managing the GPU executions for different priority processes is further described in FIG. 4 below. In one embodiment, the kernel 112 that is a basic component of the operating system 102 and provides a level of abstraction for the device resources (e.g., processor, input/output systems, network resources, etc.).

Figure 2A:
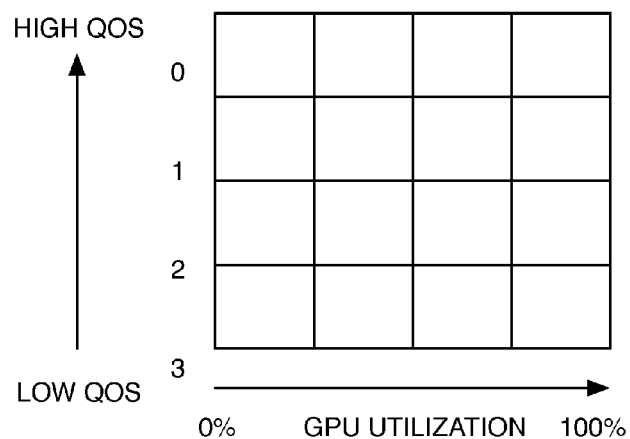
FIGS. 2A-C are illustrations of graphics processing unit (GPU) throttling tables for different levels of GPU throttling.
Figure 2B:
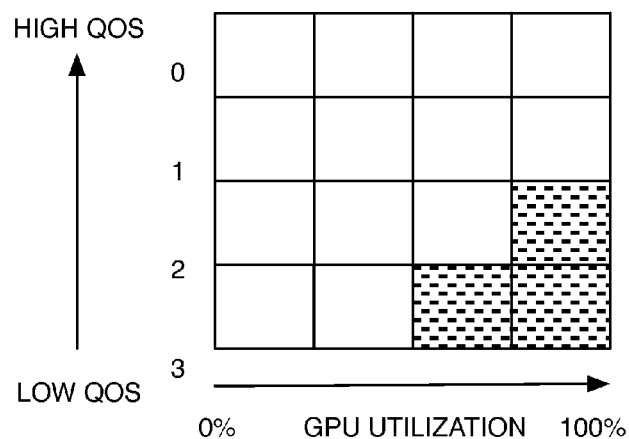
Figure 2C:
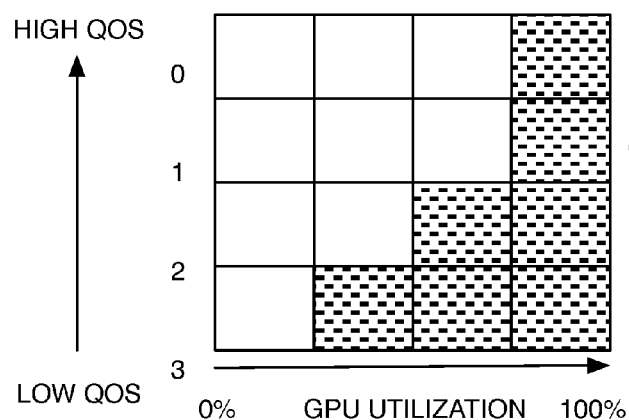

FIGS. 2A-C are illustrations of graphics processing unit (GPU) throttling tables 200A-C for different levels of GPU throttling. In one embodiment, each of the GPU throttling tables 200A-C represent GPU utilization percentages for low to high QoS priorities. For example in one embodiment, FIG. 2A illustrates a GPU throttling table 200A where there is no GPU throttling. The GPU throttling table 200A illustrates low to high QoS priority processes on the y-axis and 0-100% GPU utilization on the x-axis. For no GPU throttling, the low and high QoS priority processes will each have 100% GPU utilization for each time the GPU executes for that process. This means, one of process is being executed by the GPU, the GPU executes at full utilization. In one embodiment, full GPU utilization means that the GPU executes at the highest frequency the GPU can operate at. For example and in one embodiment, if a GPU can operate at frequencies up to 800 MHz, the GPU will execute the process at 800 MHz for all processes. In this embodiment, full GPU utilization also means that the GPU operates with a higher power and thermal load on the device.

As the thermal load on the device increases, the device may throttle some of the lower priority processes for GPU execution. As illustrated in FIG. 2B, the GPU throttling table 200B has reduced GPU utilization for a lower priority processes. For example in one embodiment, processes with a high QOS (e.g., processes with priority 0 or 1) will continue to have a GPU utilization of 100%. Processes with a lower QoS priority (e.g., processes with priority 2 or 3) will have a GPU utilization that is less than 100%. As illustrated in FIG. 2B, a process for the priority of two will have a GPU utilization of 75% and a process with a priority of three will have a GPU utilization of 50%. For example and in one embodiment, if a GPU can operate at frequencies up to 800 MHz, the GPU will execute at 800 MHz for processes with priority 0 or 1, 600 MHz for a process of priority 2, and 400 MHz for a process of priority 3. In this example, the overall GPU utilization of the device is decreased thus decreasing the overall thermal load on the device. Furthermore, high priority processes to operate with full GPU utilization, thus allowing important processes to execute normal. The lower priorities will operate with less GPU utilization.

With increasing thermal load, the device may further throttle the GPU, so that the GPU throttling affects both lower and higher priority processes. As illustrated in FIG. 2C, the GPU throttling table 200 C has reduced GPU utilization for both the lower and higher priority processes. For example and in one embodiment, a process with a priority of 0 or 1 will have a GPU utilization of 75%. A process with a priority of 2 will have a GPU utilization of 50%. A process with the priority of three, the lowest priority process, has a GPU utilization of 25%, which is the lowest GPU utilization. In this embodiment, the higher priority processes are partially throttled for GPU utilization, while the lower priority processes are more severely throttled. For example and in one embodiment, if a GPU can operate at frequencies up to 800 MHz, the GPU will execute at 600 MHz for processes with priority 0 or 1, 400 MHz for a process of priority 2, and 200 MHz for a process of priority 3.

Figure 3:
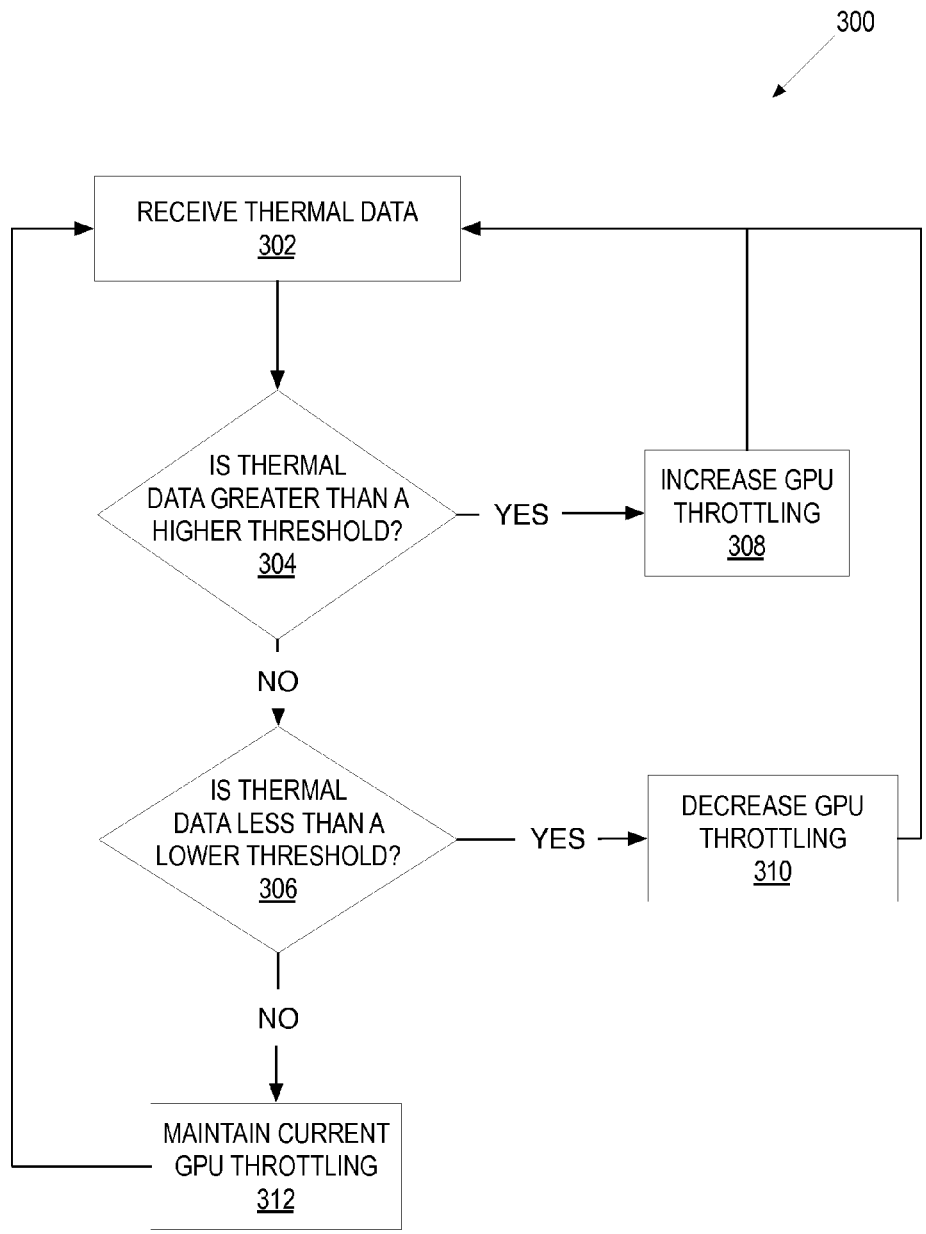
FIG. 3 is a flow diagram of one embodiment of a process to manage GPU throttling based on the thermal data of the device.
Figure 4:
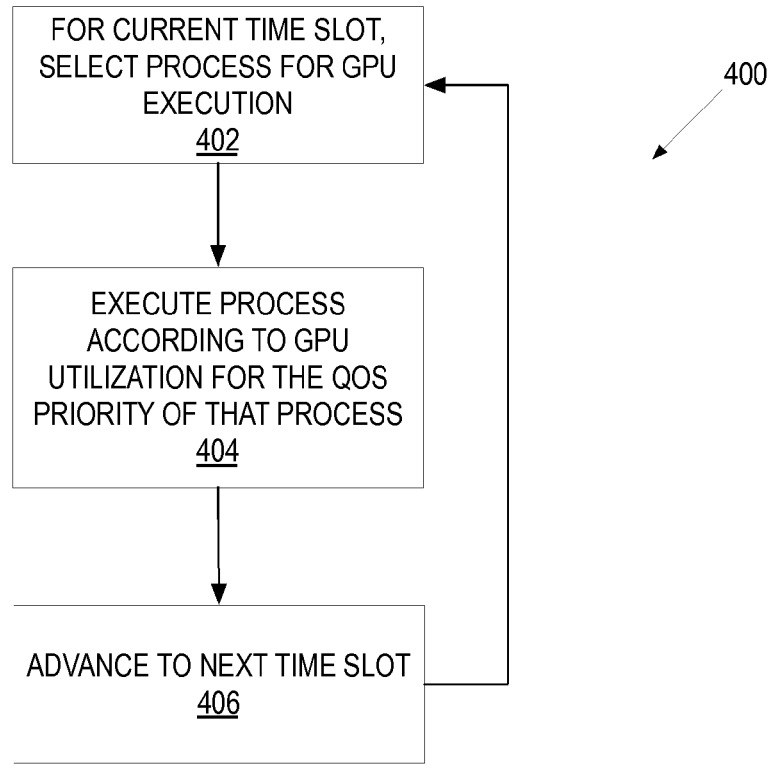
FIG. 4 is a flow diagram of one embodiment of a process to manage GPU execution according to the quality of service of a process.

FIG. 3 is a flow diagram of one embodiment of a process 300 to manage GPU throttling based on the thermal data of the device. In one embodiment, process 300 is performed by a thermal daemon to manage I/O throttling, such as thermald 112 as described above in FIG. 1. In FIG. 4, process 300 begins by receiving the thermal data at block 302. In one embodiment, the thermal data is the data related to the thermal profile or other thermal characteristics of the device. For example in one embodiment, the thermal data can be time-dependent thermal data regarding the device temperature, temperature of a particular module of the device, data regarding fan use, and/or other data related to the thermal characteristics of the device. At block 304, process 300 determines if the thermal data is greater than a higher threshold. In one embodiment, the higher threshold is a threshold that indicates that the device can have greater GPU throttling so as to mitigate the thermal load that is on the device. For example and in one embodiment, the thermal threshold can be related to the temperature of the device, a module of the device, fan speed, or some other thermal characteristic. As another example and embodiment, a set of higher thermal threshold could be if the device temperature exceeded 40° C., 45° C., 50° C., etc. In one embodiment, the thermal data may exceed more than one threshold. In another embodiment, the thermal threshold can be based on time of day or user activity. For example and in one embodiment, if process 300 knows that a user is very likely to use the machine in near future (say back from lunch), process 300 may choose to throttle low QoS tasks to leave "thermal headroom" for the task users is likely to perform. This is especially important for devices that do not have fans to actively dissipate heat. If the thermal data is greater than a higher threshold, process 300 adjusts the GPU throttling table to increase the GPU throttling at block 308. In one embodiment, process 300 adjusts the GPU throttling table by throttling one or more of the different GPU utilizations for one, some, or all of the process priorities. In this embodiment, process 300 can start to throttle a priority or further throttle an already throttled priority level. In one embodiment, process 300 throttles a priority by restricting the GPU utilization for GPU execution of that priority. For example in one embodiment, process 300 can throttle a priority by restricting a 100% GPU execution down to 80% as described in FIG. 2 above. Alternatively, process 300 can throttle a priority that is restricted from a 50% GPU utilization down to 25%. By throttling the GPU utilization for a priority, process 300 selectively throttles the different priorities, thus allowing greater GPU utilization for higher priorities and lower GPU utilization for lower priorities. This allows for less power consumption of the GPU for the device, while having GPU utilization for higher priority processes at the expense of lower GPU utilization for lower priority processes. A lower power consumption of the storage system can help mitigate the thermal load on the device.

If the thermal data is not greater than a higher threshold, process 300 determines if the thermal data is less than a lower threshold at block 306. In one embodiment, if the thermal data is less than a lower threshold, process 300 may relax the GPU throttling as the thermal load on the device may be lessening. If the thermal data is less than a lower threshold, at block 310, process 300 adjust the GPU utilization to decrease the GPU throttling. In one embodiment, process 300 relaxes the restrictions placed on the I/O throughput for one or more of the different priorities. For example and in one embodiment, process 300 can relax a priority with an 80% GPU utilization back to an unrestricted 100% GPU utilization. Alternatively, process 300 can relax a restricted priority at a 25% GPU utilization to a less restricted 50% GPU utilization. If the thermal data is not less than the lower threshold, process 300 maintains the current GPU throttling at block 312. Execution proceeds to block 312 above.

As described above, the device can selectively restrict and relax different priority GPU utilizations in response to the thermal data of the device. The device uses the different GPU utilizations to process the device GPU operations. FIG. 4 is a flow diagram of one embodiment of a process 400 to manage GPU execution according to the quality of service of a process. In one embodiment, process 400 is performed by a GPU processing module 700 that is part of the driver, such as GPU 106 or integrated graphics 104 as described in FIG. 1 above. In FIG. 4, process 400 begins by selecting a process for GPU execution for a current time slot at block 402. In one embodiment, the GPU schedules a process for execution in different time slot, so that the GPU can execute multiple processes. During a particular time slot, a GPU will execute a task of the process and, possibly, switch to another process for another time slot. In one embodiment, a scheduler keeps track of the GPU performance by using a ring buffer for each time slot. In this embodiment, the scheduler allows for preempting tasks of one or more processes in flight because the tasks are put in multiple priority based queues. When one unit of work is finished by the GPU, there is a decision of which process is to be executed next. If there is a process is an un-throttled queue, the highest priority process is selected for execution by the GPU. For lower priorities, the scheduler looks at the GPU utilization and determines if the GPU utilization has expired. In one embodiment, it is possible to either run the GPU at reduced frequency or run the GPU at same frequency but for shorter period of time so as to allow greater sleep period (e.g., GPU idle and in a low power state). In one embodiment, it may advantageous to run the GPU at a higher frequency for a shorter period of time and allow the GPU to go into idle power states, instead of running it at lower frequency, but keeping it busy for a longer period of time. For example and in one embodiment, the process 400 schedules the lower priority processes if there is room for the GPU to perform the work. In one embodiment, there is a starvation mechanism, implemented via a software scheduler to prevent the lower priority processes form starving. With different job queues, corresponding to different priority process, it is possible to hold off the scheduling of lower priority queue and lower the amount of work submitted on the GPU.

At block 404, process 400 executes the process using the GPU and according to the GPU utilization for the QoS priority of that process. As described above, each process will have a QoS priority that is used to determine the GPU utilization. In one embodiment, the GPU utilization is the GPU utilization that the GPU operate at while executing the process for the time slot. In one embodiment, the GPU utilization is a percentage of the GPU maximum or normal operating frequency. In another embodiment, the GPU utilization is an average of GPU utilization. In this embodiment, process 400 can execute the process at a high GPU utilization (e.g. at or near 100%) in one or more time slots and execute the process at a low GPU utilization in another time slot. For example and in one embodiment, if the GPU utilization is 75%, process 400 could execute the process with a GPU utilization for three out four time slots and have the GPU idle (e.g. 0% utilization) for one out of four slots. In one embodiment, having the GPU idle for a time slot may create conditions that allows for hardware components to be put into a low power state, thus allowing the device to cool down quicker. Process 400 advances to the next time slot at block 406. Execution proceeds to block 402 above.

Figure 5A:
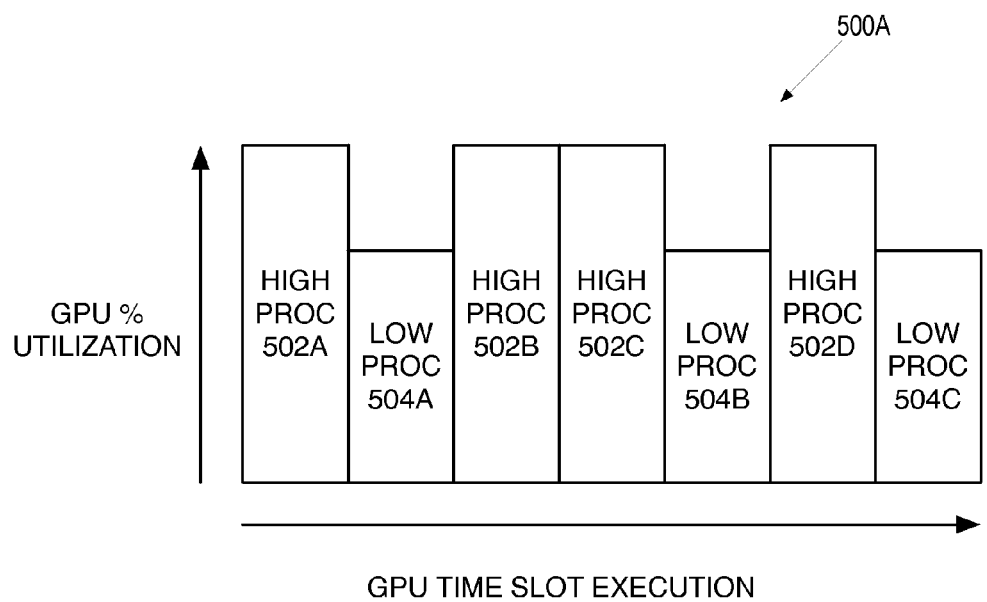
FIGS. 5A-B is a block diagram of one embodiment of GPU utilization for high and low priority processes.
Figure 5B:
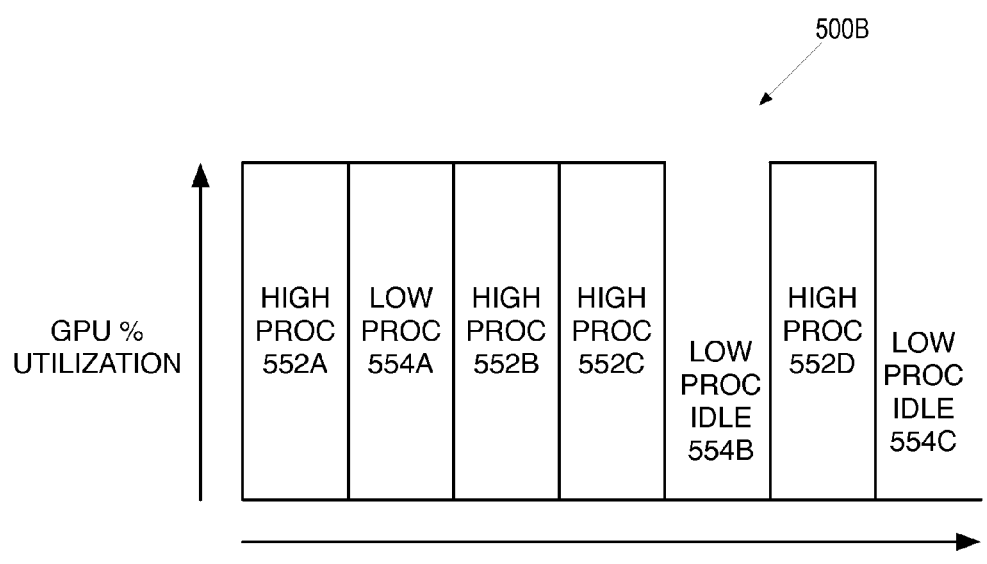

As described above, the throttled GPU utilizations are applied by process 400 during a time slot that the GPU is scheduling and executing a process. FIGS. 5A-B are block diagrams of embodiments of GPU utilization 500A-B for high and low priority processes. In FIG. 5A, the GPU executes high and low priority processes with different GPU utilizations for different time slots. In one embodiment, the high priority process is executed with a 100% GPU utilization (e.g., high priority process time slots 502A-D) and the low priority process is executed with less than 100% GPU utilization (e.g., low priority process time slots 504A-C). In this embodiment, the low priority process is executed with the same low GPU utilization for each time slot. In contrast, in FIG. 5B, the low priority process is executed with different GPU utilizations for different time slots. In one embodiment, in time slot 554A the GPU utilization is 100%, whereas the GPU is idle for time slots 554B-C. By utilizing different GPU utilizations for the low priority process, the overall GPU utilization for this process can be lowered. In addition, in FIG. 5B, the high priority process is executed with 100% GPU utilization for time slots 552A-D. While in one embodiment, FIGS. 5A-B illustrate there being more time slots allocated for a high priority process, in alternate embodiments, lower priority processes may have the same or greater number of time slot allocated than for higher priority processes.

Figure 6:
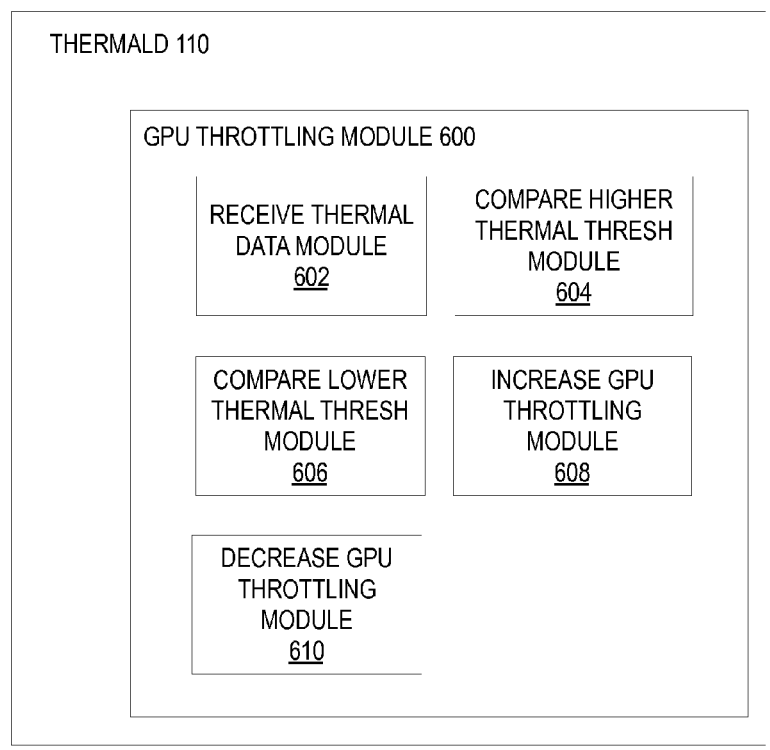
FIG. 6 is a block diagram of one embodiment of a thermal daemon that manages I/GPU throttling based on the thermal data of the device.

FIG. 6 is a block diagram of one embodiment of a thermal daemon, thermald, 110 that manages GPU throttling based on the thermal data of the device. In one embodiment, thermald 110 includes a GPU throttling module 600 that determines whether to selectively apply or relax a GPU throttle to a priority. In one embodiment, the GPU throttling module 600 includes a receive thermal data module 602, compare higher thermal threshold module 604, compare lower thermal threshold 606, increase GPU throttling module 608, and decrease GPU throttling module 610. In one embodiment, the receive thermal data module 602 receives the thermal data as described in FIG. 3, block 302 above. The compare higher thermal threshold module 604 compares the thermal data with a higher thermal threshold as described in FIG. 3, block 304 above. The compare lower thermal threshold 606 compares the thermal data with a lower thermal threshold as described in FIG. 3, block 306 above. The increase GPU throttling module 608 increases the GPU throttling for one or more processes as described in FIG. 3, block 308 above. The decrease GPU throttling module 610 decreases the GPU throttling for one or more processes as described in FIG. 3, block 310 above.

Figure 7:
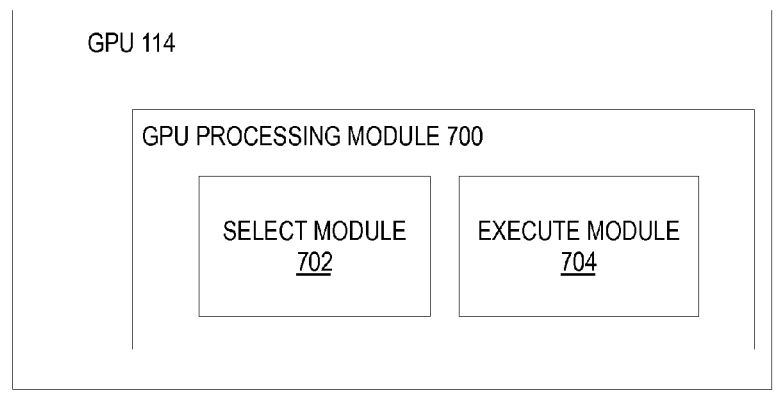
FIG. 7 is a block diagram of one embodiment of a GPU that manages GPU execution according to the quality of service of a process.

FIG. 7 is a block diagram of one embodiment of a GPU 106 that manages GPU execution according to the quality of service of a process. In one embodiment, the GPU 106 includes a GPU processing module 700 that applies the corresponding GPU utilization for a process. In one embodiment, the GPU processing module 700 includes a select module 702 and an execute module 704. In one embodiment, the select module 702 selects a process to execute by the GPU and the execute module 704 executes that process with the GPU according to the GPU utilization as described above in FIG. 4, blocks 402 and 404, respectively. In one embodiment, an integrated graphics 104 can also include a GPU processing module 700.

Figure 8:
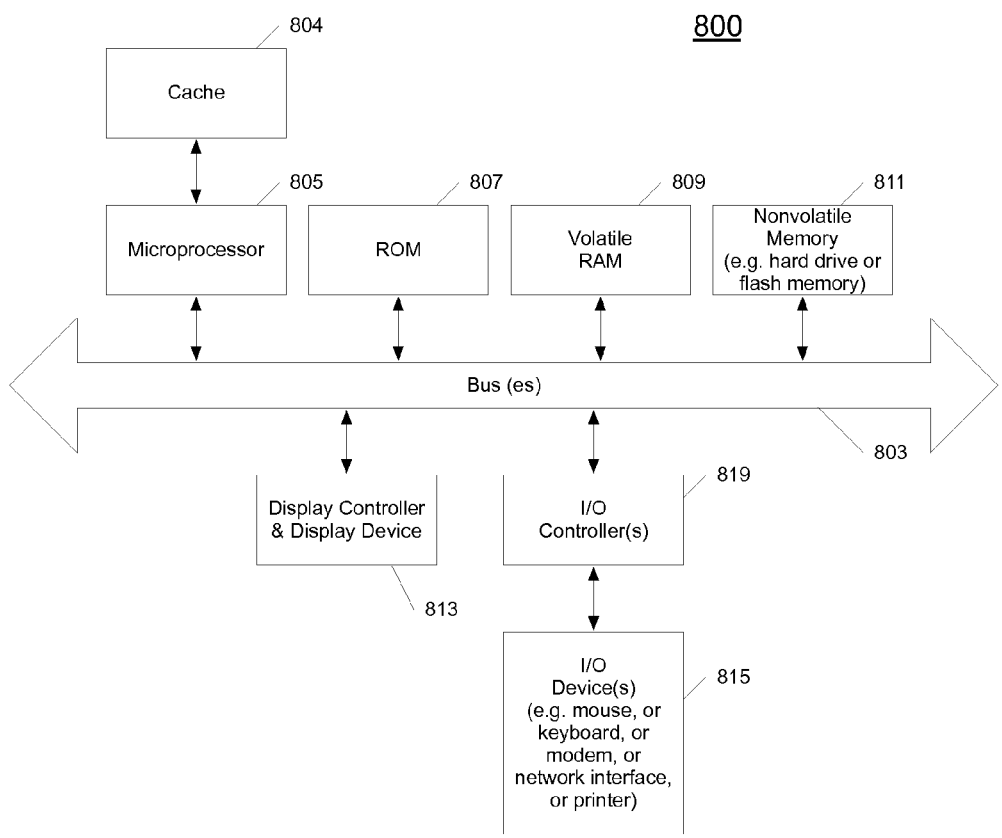
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented including a device 100 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 88 and to peripheral devices such as input/output (I/O) devices which may be mice, keyboards, modems, network interfaces, printers and other devices which are well known in the art. Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM or a flash memory or other types of memory systems, which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
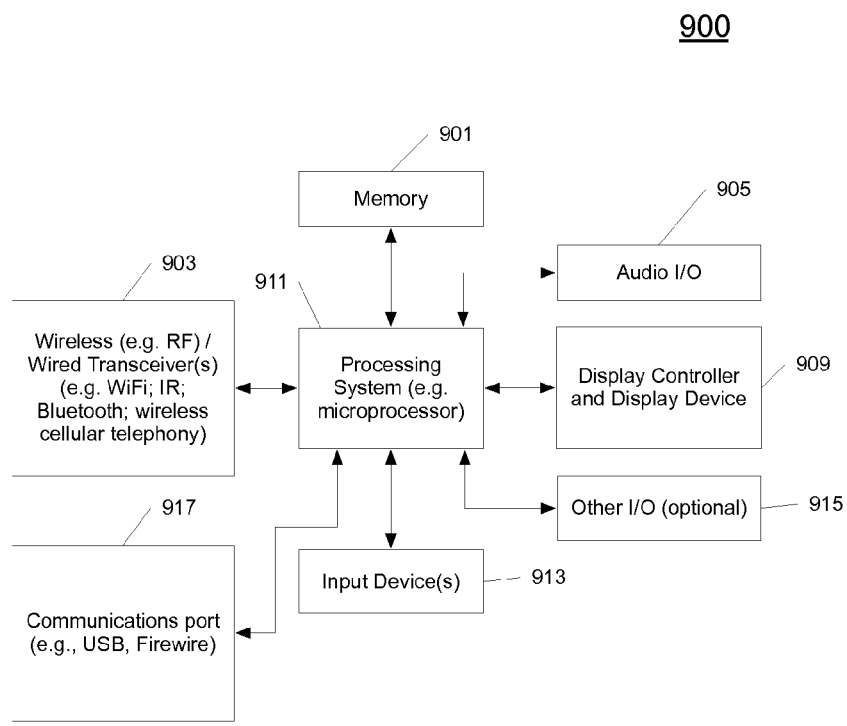
FIG. 9 shows an example of a data processing system, which may be used with one embodiment of the present invention.

FIG. 9 shows an example of another data processing system 900 which may be used with one embodiment of the present invention. For example, system 900 may be implemented as a device 100 as shown in FIG. 1. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905, which may include a microphone and a speaker for, for example, playing back music or providing telephone functionality through the speaker and microphone.

A display controller and display device 909 provide a visual user interface for the user; this digital interface may include a graphical user interface which is similar to that shown on a Macintosh computer when running OS X operating system software, or Apple iPhone when running the iOS operating system, etc. The system 900 also includes one or more wireless transceivers 903 to communicate with another data processing system, such as the system 900 of FIG. 9. A wireless transceiver may be a WLAN transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further includes one or more communications ports 917 to communicate with another data processing system, such as the system 800 of FIG. 8. The communications port may be a USB port, Firewire port, Bluetooth interface, etc.

The data processing system 900 also includes one or more input devices 913, which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems, which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone (s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "decreasing," "increasing," "maintaining," "executing," "processing," "computing," "recording,"

"restoring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to manage a thermal profile of a device, the method comprising:
monitoring thermal data of the thermal profile of the device, the device is executing a plurality of processes that utilize a graphics processing unit (GPU) of the device, the plurality of processes including a high priority process and a low priority process;
if the thermal data of the device exceeds a first thermal threshold,
decreasing a first GPU utilization for the low priority process, and
maintaining a second GPU utilization for the high priority process;
executing the low priority process using the first GPU utilization with the GPU; and
executing the high priority process using the second GPU utilization with the GPU, wherein the first GPU utilization is different from the second GPU utilization after the thermal data of the device exceeds a first thermal threshold and the first and second GPU utilizations are each a different percentage of a maximum GPU frequency.

2. The non-transitory machine-readable medium of claim 1, wherein a GPU utilization sets the amount of GPU resources are used for a process when that process is executed by the GPU.

3. The non-transitory machine-readable medium of claim 2, wherein the GPU utilization can be zero.

4. The non-transitory machine-readable medium of claim 2, wherein the GPU execution level is greater than zero and less than 100%.

5. The non-transitory machine-readable medium of claim 1, wherein the first GPU utilization is less than 100% and the second GPU utilization is 100%.

6. The non-transitory machine-readable medium of claim 1, if the thermal data of the device exceeds a second thermal threshold,
further increasing the first GPU utilization; and
decreasing the second GPU utilization, wherein the second GPU utilization is less than 100%.

7. The non-transitory machine-readable medium of claim 6, if the thermal data falls below the second thermal threshold,
restoring the first and second GPU utilization to previous values.

8. The non-transitory machine-readable medium of claim 1, wherein the thermal data is selected from the group consisting of device temperature and audible fan noise.

9. The non-transitory machine-readable medium of claim 1, wherein the high priority process is visual process and the low priority is a batch process.

10. The non-transitory machine-readable medium of claim 1, wherein the monitoring of the thermal data comprises:
recording the device temperature.

11. A method to manage a thermal profile of a device, the method comprising:
monitoring thermal data of the thermal profile of the device, the device is executing a plurality of processes that utilize a graphics processing unit (GPU) of the device, the plurality of processes including a high priority process and a low priority process;
if the thermal data of the device exceeds a first thermal threshold,
decreasing a first GPU utilization for the low priority process, and
maintaining a second GPU utilization for the high priority process;
executing the low priority process using the first GPU utilization with the GPU; and
executing the high priority process using the second GPU utilization with the GPU, wherein the first GPU utilization is different from the second GPU utilization after the thermal data of the device exceeds a first thermal threshold and the first and second GPU utilizations are each a different percentage of a maximum GPU frequency.

12. The method of claim 11, wherein a GPU utilization sets the amount of GPU resources are used for a process when that process is executed by the GPU.

13. The method of claim 11, if the thermal data of the device exceeds a second thermal threshold,
further increasing the first GPU utilization; and
decreasing the second GPU utilization, wherein the second GPU utilization is less than 100%.

14. The method of claim 13, if the thermal data falls below the second thermal threshold,
restoring the first and second GPU utilization to previous values.

15. The method of claim 11, wherein the thermal data is selected from the group consisting of device temperature and audible fan noise.

16. The method of claim 11, wherein the high priority process is visual process and the low priority is a batch process.

17. A device to manage a thermal profile of the device, the device comprising:
a processor;
a memory coupled to the processor though a bus; and
a process executed from the memory by the processor that causes the processor to monitor thermal data of the thermal profile of the device, the device is executing a plurality of processes that utilize a graphics processing unit (GPU) of the device, the plurality of processes including a high priority process and a low priority process, if the thermal data of the device exceeds a first thermal threshold, decrease a first GPU utilization for the low priority process, and maintain a second GPU utilization for the high priority process, execute the low priority process using the first GPU utilization with the GPU, and execute the high priority process using the second GPU utilization with the GPU, wherein the first GPU utilization is different from the second GPU utilization after the thermal data of the device exceeds a first thermal threshold and the first and second GPU utilizations are each a different percentage of a maximum GPU frequency.

18. The device of claim 17, wherein a GPU utilization sets the amount of GPU resources are used for a process when that process is executed by the GPU.

19. The device of claim 17, if the thermal data of the device exceeds a second thermal threshold, the process further causes the processor to further increase the first GPU utilization and decrease the second GPU utilization, wherein the second GPU utilization is less than 100%.

20. The device of claim 19, if the thermal data falls below the second thermal threshold, the process further causes the processor to restore the first and second GPU utilization to previous values.

* * * * *